(12) United States Patent
Haraguchi

(10) Patent No.: US 10,701,917 B2
(45) Date of Patent: Jul. 7, 2020

(54) DUAL-BEARING REEL

(71) Applicant: Shimano Inc., Sakai, Osaka (JP)

(72) Inventor: Hitoshi Haraguchi, Sakai (JP)

(73) Assignee: SHIMANO INC., Sakai, Osaka (JP)

( * ) Notice: Subject to any disclaimer, the term of this patent is extended or adjusted under 35 U.S.C. 154(b) by 102 days.

(21) Appl. No.: 16/213,241

(22) Filed: Dec. 7, 2018

(65) Prior Publication Data
US 2019/0230909 A1 Aug. 1, 2019

(30) Foreign Application Priority Data

Feb. 1, 2018 (JP) ................................. 2018-016180

(51) Int. Cl.
| | | |
|---|---|---|
| *A01K 89/01* | (2006.01) | |
| *A01K 89/033* | (2006.01) | |
| *A01K 89/00* | (2006.01) | |
| *A01K 89/015* | (2006.01) | |

(52) U.S. Cl.
CPC .......... *A01K 89/058* (2015.05); *A01K 89/006* (2013.01); *A01K 89/0185* (2015.05); *A01K 89/01901* (2015.05)

(58) Field of Classification Search
CPC .......... A01K 89/0188; A01K 89/01901; A01K 89/01902
See application file for complete search history.

(56) References Cited

U.S. PATENT DOCUMENTS

| | | | | |
|---|---|---|---|---|
| 5,333,812 A * | 8/1994 | Sato | ................... | A01K 89/0188 242/261 |
| 2012/0067993 A1* | 3/2012 | Nakagawa | ....... | A01K 89/01901 242/257 |
| 2015/0342167 A1* | 12/2015 | Takechi | ............. | A01K 89/0189 242/257 |
| 2015/0366179 A1* | 12/2015 | Ikuta | .................... | A01K 89/006 242/261 |
| 2017/0328421 A1* | 11/2017 | Ahmad | ............ | A01K 89/01901 |

FOREIGN PATENT DOCUMENTS

JP 2016-220570 A 12/2016

* cited by examiner

*Primary Examiner* — Emmanuel M Marcelo
(74) *Attorney, Agent, or Firm* — United IP Counselors, LLC

(57) ABSTRACT

A dual-bearing reel is described. A clutch mechanism transmits and interrupts the rotational force of the reel handle to the reel spool. A clutch-operating member is movably supported by the reel body between a first position and a second position, and is biased toward the first position. A clutch control mechanism includes a clutch cam that rotates only in one direction each time the clutch-operating member moves from the first to the second position. The clutch control mechanism alternately switches the clutch mechanism to the transmitting state and the interrupting state by rotation of the clutch cam. A clutch return mechanism returns the clutch to the transmitting state by rotation of the handle when the clutch mechanism is in the interrupting state. A regulating member regulates operation of the clutch return mechanism when the clutch mechanism is in the interrupting state by movement of the clutch-operating member.

16 Claims, 7 Drawing Sheets

DUAL-BEARING REEL

CROSS-REFERENCE TO RELATED APPLICATIONS

This application claims priority to Japanese Patent Application No. 2018-016180, filed Feb. 1, 2018. The contents of that application are incorporated by reference in their entirety.

BACKGROUND

Technical Field

The present disclosure relates to a dual-bearing reel.

Background Information

A dual-bearing reel is provided with a clutch mechanism for transmitting and interrupting rotation of a handle to a spool. For example, in the dual-bearing reel disclosed in Japanese Laid Open Patent Application No. 2016-220570 (Patent Document 1), every time a clutch-operating member is operated, a clutch cam rotates in one direction only, whereby the clutch mechanism alternately switches between a transmitting state and an interrupting state. The clutch-operating member is movable between a first position and a second position, and is biased toward the first position. The dual-bearing reel of Patent Document 1 is also provided with a clutch return mechanism that switches the clutch mechanism in the interrupting state to the transmitting state by rotation of the handle in the line-winding direction. Rotation of the handle in the opposite direction to the line-winding direction is prevented by a one-way clutch.

When for example the clutch mechanism is in the transmitting state, when the fishing line is pulled whereby a strong tension acts on the fishing line, a force in the direction opposite to the line-winding direction acts on the handle. In this state, when the clutch-operating member disclosed in Patent Document 1 is operated to switch the clutch mechanism from the transmitting state to the interrupting state, the clutch return mechanism may accidentally operate due to sudden rotation of the handle in the line-winding direction. For example, in the case of a constitution in which the clutch mechanism switches between the transmitting state and the interrupting state by inversion of the clutch cam, inversion of the clutch cam by the force of pushing down the clutch-operating member, that is, rotation of the handle in the line-winding direction, is inhibited, whereby the operation of the clutch return mechanism is inhibited. On the other hand, in the case of a configuration in which the clutch mechanism is switched between the transmitting state and the interrupting state by rotation of the clutch cam in one direction only as in the dual-bearing reel of Patent Document 1, the absence of a force attempting to holdback sudden rotation of the handle leads to the clutch return mechanism being operated. Thereby, the clutch mechanism that had been switched to the interrupting state may be unintentionally returned to the transmitting state.

BRIEF SUMMARY

In a dual-bearing reel in which a clutch mechanism is alternately switched between a transmitting state and an interrupting state by rotation of a clutch cam that rotates only in one direction each time a clutch-operating member is operated, the object of the present disclosure is to prevent unintentional operation of a clutch return mechanism when the clutch-operating member is operated to switch the clutch mechanism from the transmitting state to the interrupting state.

A dual-bearing reel of the present disclosure is provided with a reel body, a spool, a handle, a clutch mechanism, a clutch-operating member, a clutch control mechanism, a clutch return mechanism, and a regulating member. The handle is rotatable with respect to the reel body. The spool is rotatable with respect to the reel body. The clutch mechanism transmits and interrupts a rotational force of the handle to the spool. The clutch-operating member is movably supported by the reel body between a first position and a second position and is biased toward a first position side. The clutch control mechanism has a clutch cam that rotates only in one direction each time the clutch-operating member moves from the first position to the second position, and the clutch control mechanism alternately switches the clutch mechanism to the transmitting state and the interrupting state by rotation of the clutch cam. The clutch return mechanism returns the clutch mechanism to the transmitting state by rotation of the handle when the clutch mechanism is in the interrupting state. The regulating member regulates operation of the clutch return mechanism when the clutch mechanism has been switched from the transmitting state to the interrupting state by movement of the clutch-operating member.

In this dual-bearing reel, in a state in which for example the clutch-operating member is in the transmitting state and strong tension acts on the fishing line, when the clutch-operating member is operated to switch the clutch mechanism from the transmitting state to the interrupting state, it is possible to regulate the operation of the clutch operation mechanism by the regulating member. Thereby, it is possible to prevent unintentional operation of the clutch return mechanism due to sudden rotation of the handle.

The dual-bearing reel is preferably further provided with a spool shaft that supports the spool, with the clutch-operating member having a rotating part that is rotatable around an axis of the spool shaft, and the regulating member being provided on the rotating part of the clutch-operating member. In this case, when the clutch mechanism has been switched from the transmitting state to the interrupting state, it is possible to prevent operation of the clutch return mechanism with a simple constitution.

The regulating member is preferably integrally provided with the rotating part. In this case, it is possible to reduce the number of parts.

The regulating member is preferably provided extending from the rotating part in the axial direction of the spool shaft.

The clutch cam of the clutch control mechanism preferably rotates in a first direction in accordance with movement of the clutch-operating member and has on an outer circumferential surface thereof teeth provided spaced apart in the circumferential direction. The clutch return mechanism has a rotating member that rotates in accordance with rotation of the handle and that has projections for pushing the teeth of the clutch cam to cause the clutch cam to rotate in the first direction by rotation of the handle when the clutch mechanism is in the interrupting state. The regulating member regulates interference between the teeth of the clutch cam and the projections of the rotating member when the clutch mechanism has been switched from the transmitting state to the interrupting state by movement of the clutch-operating member.

The dual-bearing reel is preferably further provided with a drive shaft to which the handle is connected in an integrally rotatable manner and that supports the rotating member, and a torque limiting mechanism that limits torque transmitted between the drive shaft and the rotating member. In this case, when a large load is applied to the regulating member while the regulating member is regulating operation of the clutch return mechanism, the handle rotates relative to the rotating member. Thereby, it is possible to prevent damage to the regulating member.

Accordingly to the present disclosure, in the dual-bearing reel in which the clutch mechanism is alternately switched between the transmitting state and the interrupting state each time the clutch-operating member is operated, it is possible to prevent unintentional operation of the clutch return mechanism when the clutch-operating member is operated to switch the clutch mechanism from the transmitting state to the interrupting state.

DETAILED DESCRIPTION OF EMBODIMENTS

First Embodiment

Figure 1:
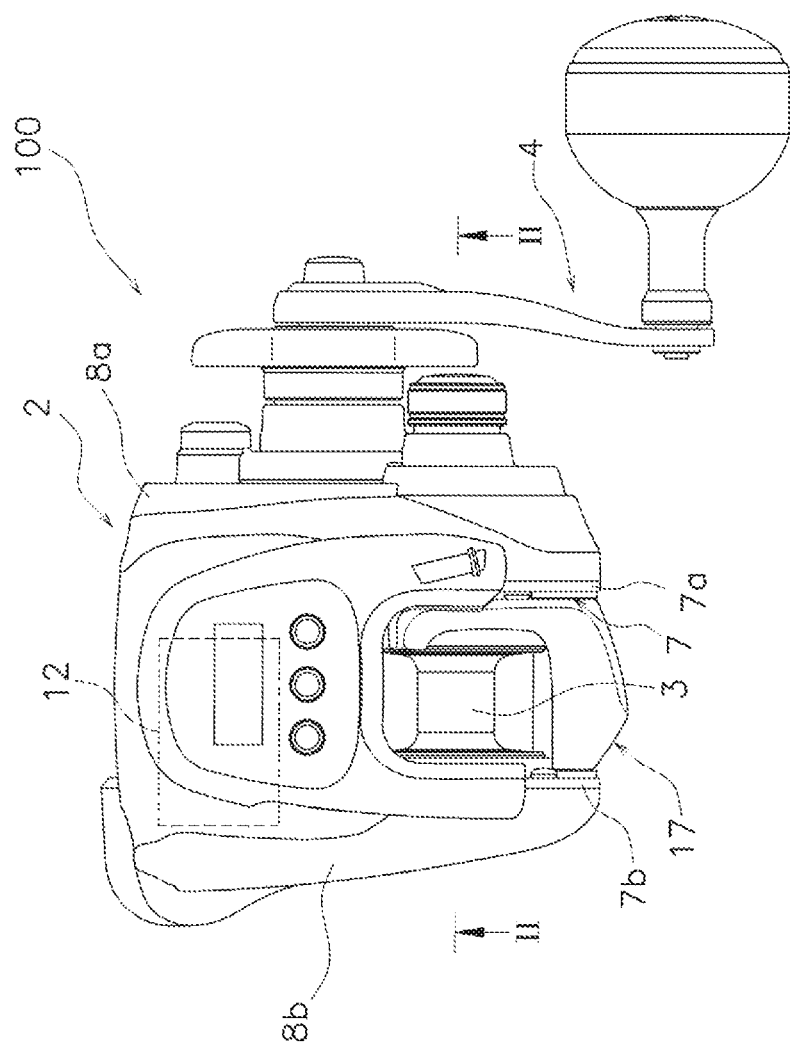
FIG. 1 is a plan view of a dual-bearing reel of a first embodiment of the present disclosure.
Figure 2:
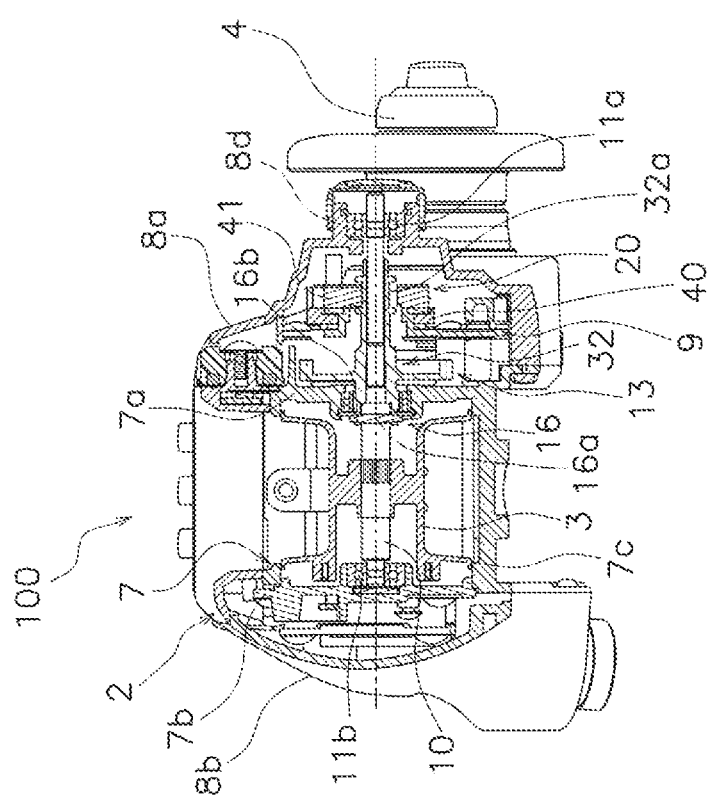
FIG. 2 is a cross-sectional view along line II-II of FIG. 1.
Figure 3:
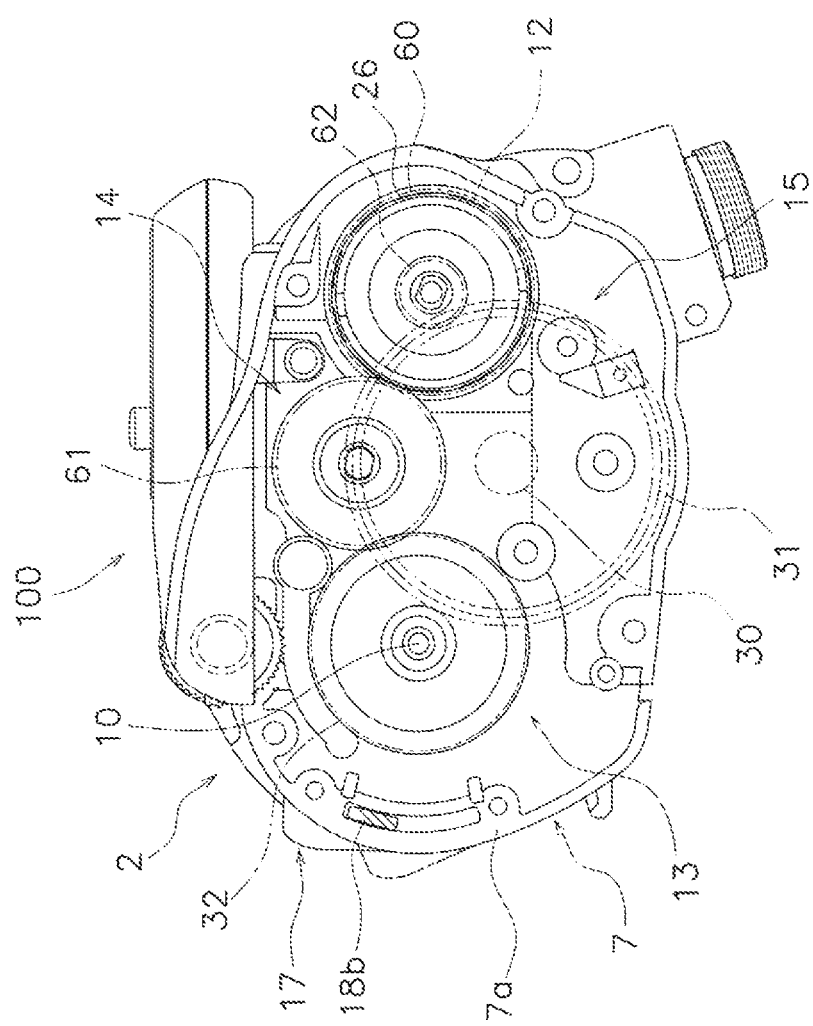
FIG. 3 is a left side view of an electric reel in the state of a first side cover and a mechanism mounting plate having been removed.

As shown in FIGS. 1 to 3, a dual-bearing reel 100 in which one embodiment of the present disclosure is adopted is provided with a reel body 2, a spool 3, a handle 4, and a spool drive mechanism 13 (see FIG. 3). The dual-bearing reel 100 is an electric reel in which the spool 3 rotates by driving a motor 12 with electric power supplied from an external power supply.

The reel body 2 has a frame 7, a first side cover 8a, and a second side cover 8b. The frame 7 has a first side plate 7a, a second side plate 7b, a plurality of couplers 7c, and a mechanism mounting plate 9.

The first side plate 7a is disposed on a right side facing the front of the frame 7 (the direction in which fishing line is cast). The second side plate 7b is disposed on a left side of the frame 7, being spaced apart from the first sideplate 7a in the axial direction. The plurality of couplers 7c extend in the axial direction and couple the first side plate 7a and the second side plate 7b. The mechanism mounting plate 9 is disposed between the first side plate 7a and the first side cover 8a. The mechanism mounting plate 9 is disposed between the first side plate 7a and the first side cover 8a, and various mechanisms are mounted on the mechanism mounting plate 9.

The first side cover 8a covers a right side of the first side plate 7a of the frame 7. The second side cover 8b covers a left side of the second side plate 7b of the frame 7.

As shown in FIG. 2, the spool 3 is rotatable with respect to the reel body 2, and is disposed between the first side plate 7a and the second sideplate 7b. The spool 3 is supported by a spool shaft 10 extending in an axial direction inside the reel body 2. The spool 3 is mounted to the spool shaft 10 so as to be integrally rotatable therewith. The spool shaft 10 is rotatably supported in the reel body 2 by a pair of bearings 11a and 11b disposed in the reel body 2.

The handle 4 is rotatable with respect to the reel body 2. The handle 4 is provided on the first side cover 8a side of the reel body 2.

The spool drive mechanism 13 transmits rotation of the handle 4 and the motor 12 to the spool 3. As shown in FIG. 3, the spool drive mechanism 13 has a first rotation transmission mechanism 14 and a second rotation transmission mechanism 15.

The first rotation transmission mechanism 14 reduces rotation of the motor 12 and transmits the rotation to the spool 3. More specifically, the first rotation transmission mechanism 14 has a planetary gear mechanism (not shown) connected to an output shaft of the motor 12, a first gear member 60, a second gear member 61, and a pinion gear 32.

The rotation of the motor 12 is transmitted to the first gear member 60 via the planetary gear mechanism. The second gear member 61 meshes with the first gear member 60. The second gear member 61 is an intermediate gear for transmitting rotation of the first gear member 60 to the pinion gear 32 and meshes with the pinion gear 32.

The pinion gear 32 is rotatable about the axis of the spool shaft 10, with the spool shaft 10 penetrating an inner periphery thereof. The pinion gear 32 is provided in the reel body 2 to be movable in the axial direction between a connected position where the pinion gear 32 is integrally rotatably connected to the spool shaft 10 and a released position where the connection with the spool shaft 10 is released. The pinion gear 32 engages with a clutch yoke 41 to be described later and moves in the axial direction together with the clutch yoke 41. The pinion gear 32 has an annular concavity 32a (see FIGS. 2 and 4) with which the clutch yoke 41 engages.

Figure 4:
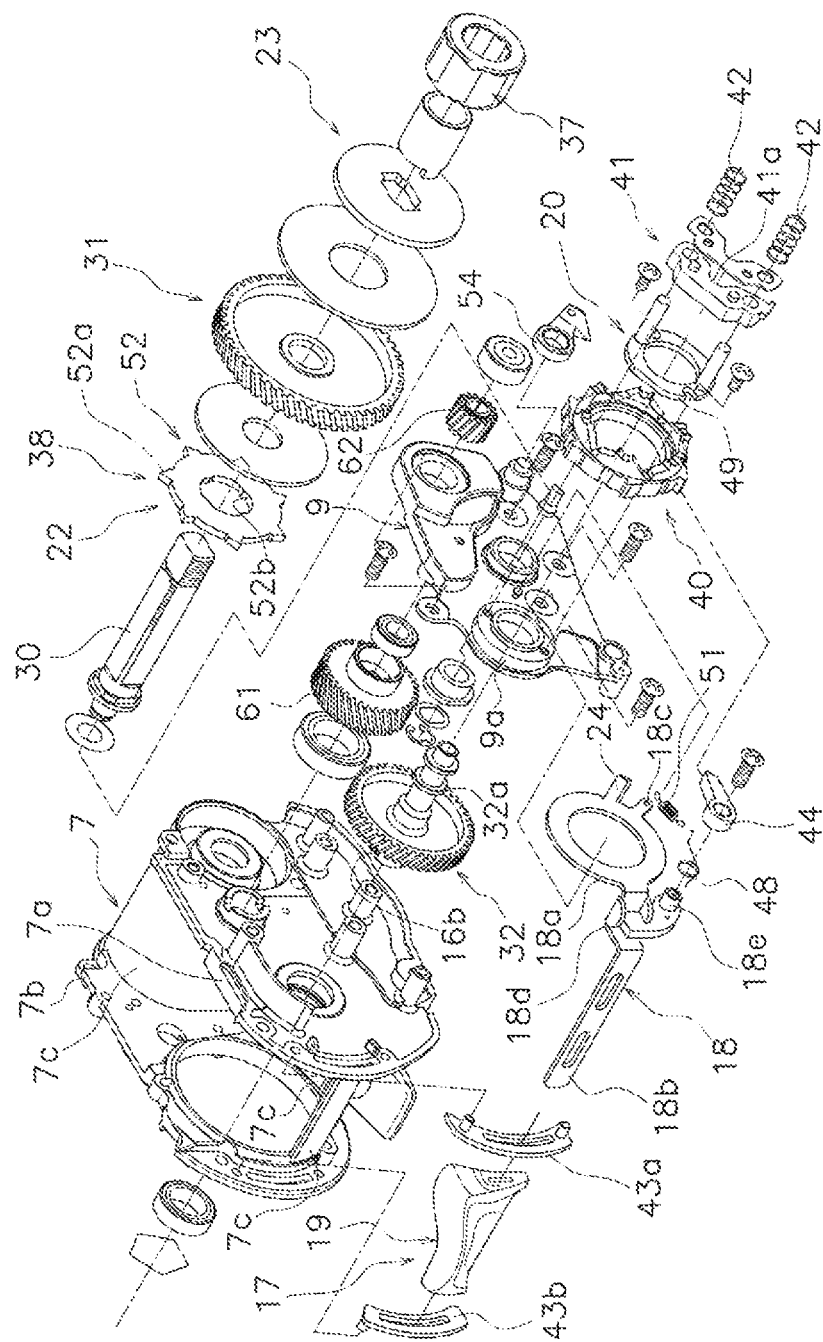
FIG. 4 is an exploded perspective view of a part of the dual-bearing reel.

The second rotation transmission mechanism 15 transmits the rotation of the handle 4 to the spool 3 via the first rotation transmission mechanism 14. As shown in FIG. 4, the second rotation transmission mechanism 15 is provided with a drive shaft 30, a drive gear 31, and a third gear member 62.

Figure 5:
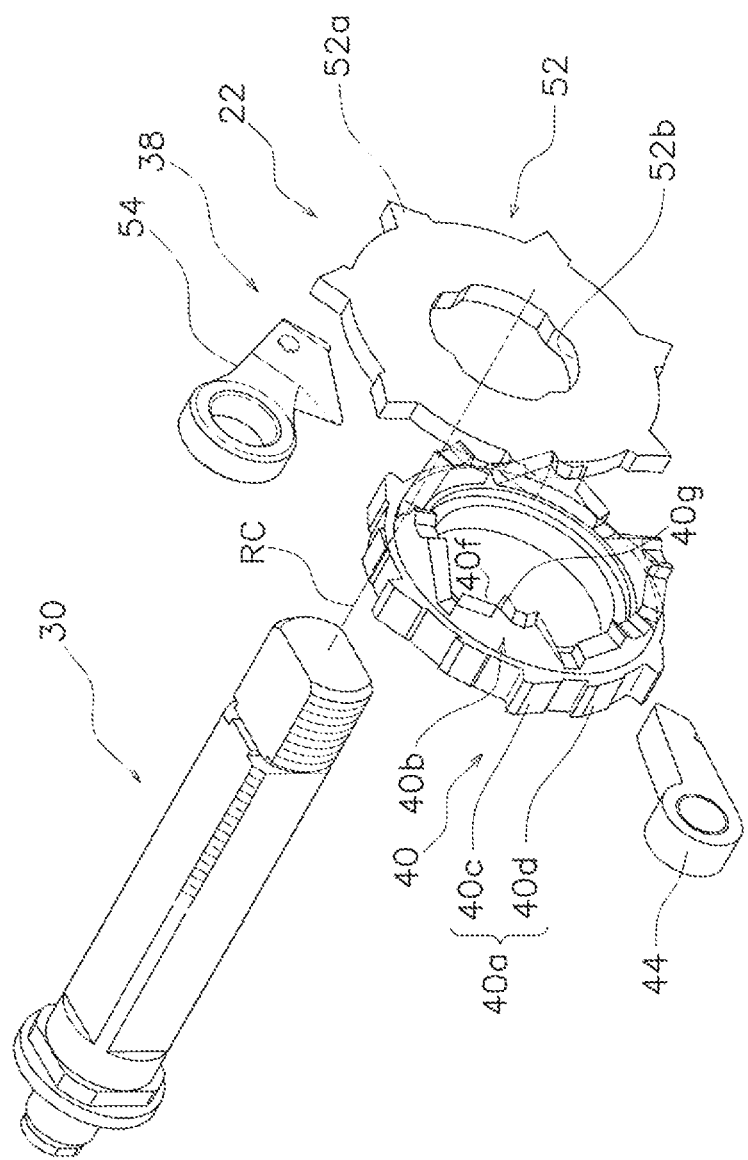
FIG. 5 is an exploded perspective view of a clutch return mechanism.

The handle 4 is connected to the drive shaft 30 so as to rotate integrally therewith. The drive shaft 30 is allowed to rotate only in the line-winding direction by a roller clutch 37 mounted on the first side cover 8a. That is, the drive shaft 30 is prohibited from rotating in the direction opposite to the line-winding direction. As shown in FIGS. 4 and 5, the drive shaft 30 is also prohibited from rotating in the direction opposite the line-winding direction by a claw-type one-way clutch 38. The one-way clutch 38 has a rotating member 52 and a claw member 54. A detailed configuration of the rotating member 52 will be given in the description below of a clutch return mechanism 22.

As shown in FIG. 4, the claw member 54 is swingably mounted to the mechanism mounting plate 9. The claw member 54 is capable of engaging with projections 52a (see FIG. 4) of the rotating member 52. For example, in a state in which the claw member 54 is engaged with the projection 52a of the rotating member 52, rotation of the rotating member 52 in the line-winding direction is permitted, while rotation of the rotating member 52 in the direction opposite to the line-winding direction is regulated.

The drive gear 31 is rotatably mounted on the drive shaft 30. The rotation of the drive shaft 30 is transmitted to the drive gear 31 via a drag mechanism 23 (see FIG. 4).

The third gear member 62 meshes with the drive gear 31 and is coupled to a carrier of the planetary gear mechanism so as to be integrally rotatable therewith. Thereby, the rotation of the third gear member 62 is transmitted to the pinion gear 32 via the carrier, the first gear member 60, and the second gear member 61.

Figure 6:
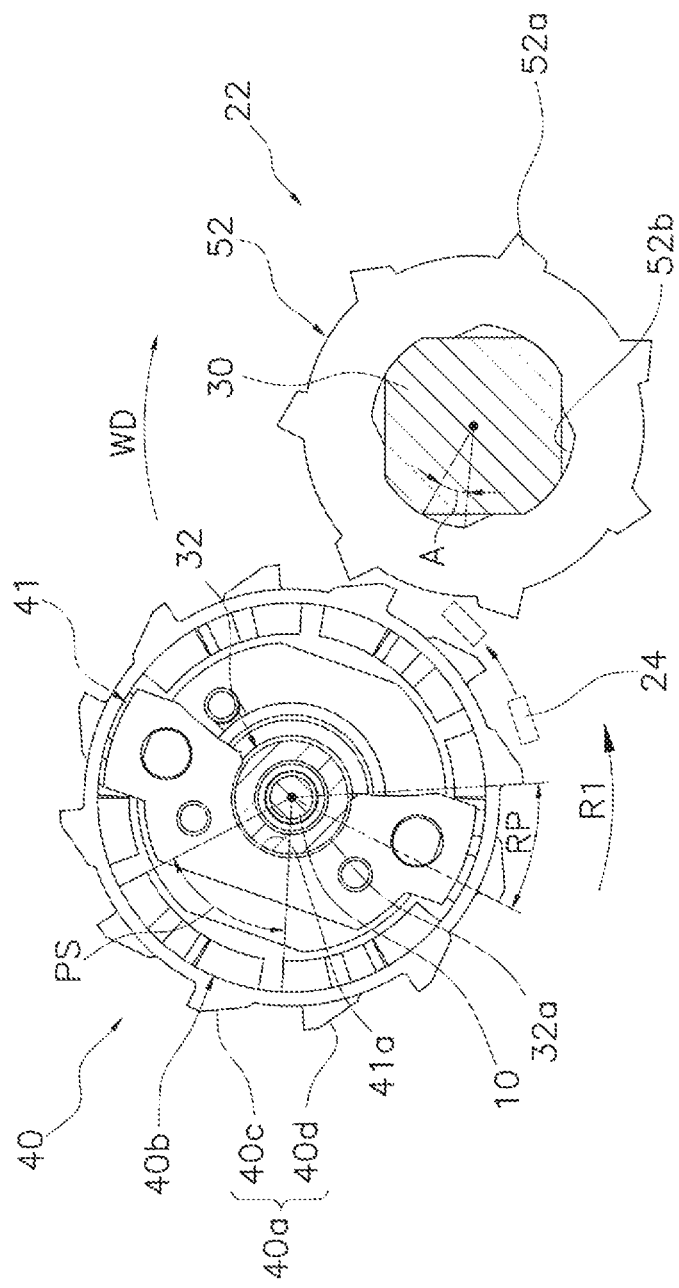
FIG. 6 is a side view showing the clutch return mechanism.

The dual-bearing reel 100 is further provided with a clutch mechanism 16 (see FIG. 2) and a clutch-operating member 17 (see FIG. 3). Further, as shown in FIGS. 4 to 6, the dual-bearing reel 100 is also provided with a clutch control mechanism 20, the clutch return mechanism 22, and a regulating member 24.

<Clutch Mechanism 16>

The clutch mechanism 16 is a mechanism, and one example of a means, for transmitting and interrupting rotational force of the handle 4 to the spool 3. The clutch mechanism 16 has the same configuration as a conventional clutch mechanism, and is provided between the spool shaft 10 and the pinion gear 32. As shown in FIG. 2, the clutch mechanism 16 has an engaging pin 16*a* and an engaging recess 16*b*.

When the clutch mechanism 16 is in the transmitting state, that is, when the pinion gear 32 is in the connected position, the engaging pin 16*a* is engaged with the engaging recess 16*b*, whereby rotation of the pinion gear 32 is transmitted to the spool shaft 10. On the other hand, when the clutch mechanism. 16 is in the interrupting state, that is, when the pinion gear 32 is in the released position, the engaging pin 16*a* is disengaged from the engaging recess 16*b*, whereby the rotation of the pinion gear 32 is not transmitted to the spool shaft 10.

<Clutch-Operating Member 17>

At the rear of the reel body 2, the clutch-operating member 17 is supported on the reel body 2 to be movable in the up-down direction. In FIG. 3, the clutch-operating member 17 is movable between a first position indicated by a solid line and a second position indicated by a broken line, being biased toward a first position side.

As shown in FIG. 4, the clutch-operating member 17 has a rotating part 18 and an operating part 19. The rotating part 18 is supported in the reel body 2 so as to be rotatable around the axis of the spool shaft 10. The rotating part 18 has a ring 18*a*, an insertion part 18*b*, a first spring hook 18*c*, and a connecting part 18*d*. The ring 18*a* is swingably supported on an outer peripheral surface of a first support part 9*a* provided in the mechanism mounting plate 9. The insertion part 18*b* penetrates the operation part 19 in the axial direction and is connected to the operation part 19 so as to be integrally movable therewith.

The first spring hook 18*c* extends radially outward from the outer periphery of the ring 18*a*. One end of a first spring member 51 that biases the clutch-operating member 17 toward the first position is hooked to the first spring hook 18*c*. The first spring member 51 is, for example, a coil spring. The other end of the first spring member 51 is hooked to an outer side surface of the first side cover 8*a* side of the mechanism mounting plate 9.

The connecting part 18*d* connects the ring 18*a* and the insertion part 18*b*. The connecting part 18*d* is provided with a support shaft 18*e* for supporting a clutch pawl 44, to be described below, of the clutch control mechanism 20.

The operating part 19 is a part that is operated by pressing by hand the clutch-operating member 17. The operating part 19 is arranged substantially parallel to the spool shaft 10. The operating part 19 is movable along the first side plate 7*a* and the second side plate 7*b* via a first contact member 43*a* and a second contact member 43*b*.

<Clutch Control Mechanism 20>

The clutch control mechanism 20 alternately switches the clutch mechanism 16 between the transmitting state and the interrupting state each time the clutch-operating member 17 moves from the first position to the second position. The clutch control mechanism 20 serves as one example of a control means for alternately switching the clutch mechanism between the transmitting state and the interrupting state. Since the configuration of the clutch control mechanism 20 is the same as a conventional configuration, a description thereof will be brief.

As shown in FIGS. 4 and 5, the clutch control mechanism 20 has a clutch cam 40, the clutch yoke 41, and the clutch pawl 44.

The clutch cam 40 rotates only in one direction each time the clutch-operating member 17 moves from the first position to the second position. Specifically, each time the clutch-operating member 17 moves from the first position to the second position, the clutch cam 40 rotates by a predetermined rotational phase RP in a first direction R1 (see FIG. 6). The clutch cam 40 is rotatably mounted on the first support part 9*a* of the mechanism mounting plate 9.

As shown in FIGS. 5 and 6, the clutch cam 40 has a plurality of ratchet teeth 40*a* and a plurality of cams 40*b*. The ratchet teeth 40*a* are an example of teeth. The ratchet teeth 40*a* are provided on an outer circumferential surface of the clutch cam 40, being spaced apart in a circumferential direction. The predetermined rotational phase RP is determined by the number of the ratchet teeth 40*a*. In the present embodiment, there are 12 ratchet teeth 40*a*, with the predetermined rotational phase RP therefore being 30 degrees.

As shown in FIG. 6, each ratchet tooth 40*a* has a first ratchet tooth 40*c* and a second ratchet tooth 40*d*. The first ratchet tooth 40*c* and the second ratchet tooth 40*d* are alternately provided spaced apart in the circumferential direction.

The cams 40*b* are spaced apart in the circumferential direction with a phase PS that is related to the predetermined rotational phase RP. The cams 40*b* move the clutch yoke 41 in the axial direction each time the clutch-operating member 17 moves from the first position to the second position.

The clutch yoke 41 is provided to move the pinion gear 32 to the connected position and the released position. As shown in FIG. 4, the clutch yoke 41 is supported to be movable in the axial direction by a guide member 49 fixed to the first support part 9*a* of the mechanism mounting plate 9. The clutch yoke 41 is biased toward the clutch cam 40 in the axial direction by two second spring members 42 mounted on the guide member 49. The clutch yoke 41 has an engaging part 41*a* that engages with the annular concavity 32*a* of the pinion gear 32.

The clutch pawl 44 is swingably supported on the support shaft 18*e* of the rotating part 18. As the clutch-operating member 17 moves from the first position to the second position, the clutch pawl 44 causes the clutch cam 40 to rotate by the predetermined rotation phase RP in the first direction R1. More specifically, the clutch pawl 44 engages with either the first ratchet tooth 40*c* or the second ratchet tooth 40*d* of the ratchet teeth 40*a* to push the clutch cam 40 in the first direction R1. The clutch pawl 44 is biased toward the ratchet teeth 40*a* by a third spring member 48 supported by the support shaft 18*e* of the rotating part 18.

<Clutch Return Mechanism 22>

The clutch return mechanism 22 is a mechanism for returning the clutch mechanism 16 to the transmitting state by rotation of the handle 4 when the clutch mechanism 16 is in the interrupting state. The clutch return mechanism 22 is also one example of a means for returning the clutch mechanism 16 to the transmitting state by rotation of the handle 4. As shown in FIGS. 5 and 6, the clutch return mechanism 22 has a rotating member 52. The rotating member 52 is supported by the drive shaft 30 and rotates in accordance with the rotation of the handle 4. The rotating member 52 has a plurality of the projections 52a and a connecting hole 52b.

The projections 52a are provided spaced apart in the circumferential direction. When the clutch mechanism 16 is in the interrupting state, the projections 52a engage with the first ratchet teeth 40c of the clutch cam 40 by the rotation of the handle 4, causing the clutch cam 40 to rotate in the first direction R1.

The projections 52a are configured so as not to engage with the second ratchet teeth 40d of the clutch cam 40. In greater detail, the second ratchet teeth 40d are formed to be thinner in a radial direction than the first ratchet teeth 40c. When the clutch mechanism 16 is in the transmitting state, the projections 52a are disposed in a position approaching the second ratchet teeth 40d. Therefore, even if the handle 4 rotates, the clutch cam 40 does not rotate in the first direction R1 due to the projections 52a.

The drive shaft 30 penetrates the connecting hole 52b in the axial direction. The connecting hole 52b is non-circular, and the rotating member 52 is configured to be rotatable in a predetermined angular range A with respect to the drive shaft 30. Accordingly, when the clutch cam 40 rotates in the first direction R1 upon the clutch-operating member 17 being moved from the first position to the second position, the projections 52a move so as to separate from the ratchet teeth 40a.

<Regulating Member 24>

The regulating member 24 regulates the operation of the clutch return mechanism 22 when the clutch mechanism 16 has been switched from the transmitting state to the interrupting state by movement of the clutch-operating member 17, and is one example of a means for regulating the operation of the clutch return mechanism 22. In the present embodiment, the regulating member 24 regulates the operation of the clutch return mechanism 22 in at least a part of the period from after the clutch-operating member 17 moves to the second position until the clutch-operating member 17 returns to the first position.

Specifically, when the clutch-operating member 17 is moved from the first position to the second position while the clutch mechanism 16 is in the transmitting state, the clutch mechanism 16 switches from the transmitting state to the interrupting state by the rotation of the clutch cam 40. The regulating member 24 regulates the operation of the clutch return mechanism 22 during at least a part of the period from after the clutch mechanism 16 is switched from the transmitting state to the interrupting state until the clutch-operating member 17 returns to the first position. Note that "at least a part of the time" mentioned above includes the time when the clutch-operating member 17 is in the second position.

As shown in FIG. 4, the regulating member 24 is provided on the rotating part 18 of the clutch-operating member 17. In detail, the regulating member 24 extends in a plate shape in the axial direction from the ring 18a of the rotating part 18. The regulating member 24 is provided integrally with the rotating part 18. The regulating member 24 is formed by, for example, bending a part of the rotating part 18.

When the clutch mechanism 16 is switched from the transmitting state to the interrupting state by movement of the clutch-operating member 17, the regulating member 24 regulates interference between the first ratchet teeth 40c of the clutch cam 40 and the projections 52a of the rotation member 52. Specifically, by the rotation of the rotating part 18 accompanying movement of the clutch-operating member 17 from the first position to the second position, the regulating member 24 rotates from a standby position indicated by the solid line in FIG. 6 to a regulating position indicated by the broken line. In FIG. 6, in order to make the drawing easy to understand, illustration of the rotating part 18 has been omitted.

As the clutch-operating member 17 moves from the first position to the second position, the regulating member 24 enters the path in the rotational direction of the projection 52a of the rotating member 52 and regulates the rotation of the rotating member 52 in the line-winding direction WD. Thereby, when the clutch mechanism 16 is switched from the transmitting state to the interrupting state by movement of the clutch-operating member 17, operation of the clutch return mechanism 22 due to rotation of the handle 4 can be prevented. That is, even when the clutch mechanism 16 has been switched from the transmitting state to the interrupting state due to operation of the clutch-operating member 17 while strong tension is acting on the fishing line, the regulating member 24 can regulate unintentional operation of the clutch return mechanism 22. Here, since the rotating member 52 is rotatable in the predetermined angle range A with respect to the drive shaft 30, movement of the regulating member 24 to the regulating position is not hindered by the projections 52a of the rotating member 52.

When the clutch mechanism 16 is in the interrupting state and is then switched from the interrupting state to the transmitting state by movement of the clutch-operating member 17, since the clutch mechanism 16 is already in the transmitting state, the clutch return mechanism 22 will not operate. However, in the present embodiment, when the regulating member 24 is in the regulating position, rotation of the rotating member 52 in the line-winding direction WD is regulated by the regulating member 24 regardless of the state of the clutch mechanism 16.

Second Embodiment

Figure 7:
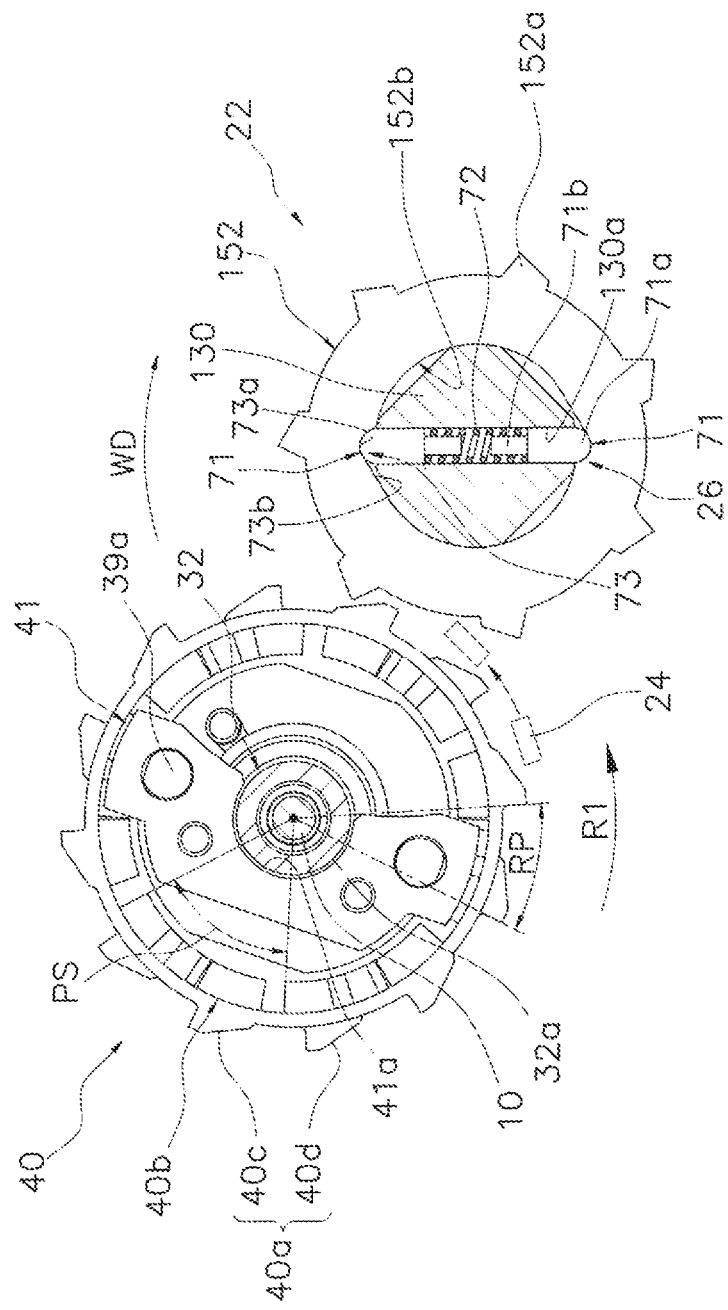
FIG. 7 is a drawing corresponding to FIG. 6 according to the second embodiment.

As shown in FIG. 7, a dual-bearing reel of a second embodiment is further provided with a torque limiting mechanism 26, which is one example of a torque-limiting means. Other constitutions are substantially the same as those in the above embodiment.

The torque limiting mechanism 26 limits torque transmitted between a drive shaft 130 and a rotating member 152. The torque limiting mechanism 26 is provided in order to prevent damage to a regulating member 24 and a projection 152a when a large load is applied to the regulating member 24. During regulation of rotation of the rotating member 152 by the regulating member 24 in a line-winding direction WD, when for example a handle 4 is operated and a large load is applied to the regulating member 24, the drive shaft 130 rotates relative to the rotating member 152.

The torque limiting mechanism. 26 has a pair of pin members 71, a biasing member 72, and at least one engaging recess 73.

The pair of pin members 71 are disposed so as to advance and retract in a through hole 130a formed through the drive shaft 130 in a radial direction. Each of the pair of pin members 71 has a head 71a having a spherical tip and a shaft 71b having a smaller diameter than the head 71a.

The biasing member 72 is, for example, a coil spring, and biases the pair of pin members 71 toward the rotating member 152. The biasing member 72 is disposed on an outer peripheral side of the shaft 71b of each of the pair of pin members 71.

The engaging recess 73 is formed in a connecting hole 152b of the rotating member 52. The connecting hole 152b is formed in a circular shape except for the engaging recess 73. Two engaging recesses 73 are provided spaced apart in the circumferential direction on an inner peripheral surface of the connecting hole 152b. The engaging recess 73 has an engaging surface 73a and a sloping surface 73b.

The engaging surface 73a is formed so as to follow the tip of the head 71a of each of the pair of pin members 71. The head 71a presses the engaging surface 73a, whereby the rotation member 152 rotates together with the rotation of the drive shaft 130. When torque equal to or greater than a value allowable is applied between the drive shaft 130 and the rotating member 152, the head 71a retracts into the through hole 130a, and the drive shaft 130 rotates relative to the rotating member 152. That is, when torque equal to or greater than a value allowable acts between the drive shaft 130 and the rotating member 152, only the drive shaft 130 rotates.

The sloping surface 73b is configured to bias the rotating member 152 in the line-winding direction WD. Specifically, the sloping surface 73b is formed so as to be linearly sloped as viewed in the axial direction such that the inner diameter gradually increases heading in the line-winding direction WD. By providing the sloping surface 73b, when the clutch cam 40 rotates in the first direction R1 by the operation of the clutch-operating member 17, the projections 152a move so as to move away from the ratchet teeth 40a. Further, by providing the sloping surface 73b, the movement of the regulating member 24 to the regulating position is not hindered by the projections 152a of the rotating member 152.

OTHER EMBODIMENTS

Although embodiments of the present disclosure have been described in detail above, it is to be understood that the present disclosure is not limited to the embodiments, and various modifications may be made within a scope not departing from the gist of the disclosure. In particular, the plurality of the embodiments and modifications disclosed in the present specification can be arbitrarily combined with each other according to necessity.

(a) The above embodiments each disclosed an electric reel that drives the spool 3 with the motor 12 as the dual-bearing reel 100, however, the present disclosure can also be applied to a manual winding dual-bearing reel.

(b) In the above embodiments, the regulating member 24 is provided integrally with the rotating part 18, but the regulating member 24 is not necessarily integrated with the rotating part 18. Further, the regulating member 24 is not necessarily provided on the rotating part 18. The regulating member 24 need only have a constitution that can be disposed at the regulating position when the clutch-operating member 17 is in the second position.

(c) In the above embodiments, the rotating member 52 plays a function in the one-way clutch 38 and the clutch return mechanism 22, but the rotating member 52 does not necessarily need to serve the configurations of both the one-way clutch 38 and the clutch return mechanism 22. A ratchet member that can engage with the claw member 54 and is integrally rotatable with the drive shaft 30 may be provided separately from the rotation member 52.

What is claimed is:

1. A dual-bearing reel comprising:
   a reel body;
   a spool that is rotatable with respect to the reel body;
   a handle that is rotatable with respect to the reel body;
   a clutch mechanism that transmits and interrupts a rotational force of the handle to the spool;
   a clutch-operating member that is movably supported by the reel body for movement between a first position and a second position and that is biased toward the first position;
   a clutch control mechanism that has a clutch cam that rotates only in one direction each time the clutch-operating member moves from the first position to the second position, wherein the clutch control mechanism alternately switches the clutch mechanism to the transmitting state and the interrupting state by rotation of the clutch cam;
   a clutch return mechanism that returns the clutch mechanism to the transmitting state by rotation of the handle when the clutch mechanism is in the interrupting state; and
   a regulating member that regulates operation of the clutch return mechanism when the clutch mechanism has been switched from the transmitting state to the interrupting state by movement of the clutch-operating member.

2. The dual-bearing reel according to claim 1, further comprising
   a spool shaft that supports the spool,
   wherein the clutch-operating member has a rotating part that is rotatable around an axis of the spool shaft; and
   the regulating member is provided on the rotating part of the clutch-operating member.

3. The dual-bearing reel according to claim 2, wherein the regulating member is integrally provided with the rotating part.

4. The dual-bearing reel according to claim 2, wherein the regulating member is provided extending from the rotating part in the axial direction of the spool shaft.

5. The dual-bearing reel according to claim 1, wherein the clutch cam of the clutch control mechanism rotates in a first direction in accordance with movement of the clutch-operating member and has on an outer circumferential surface thereof teeth provided spaced apart in the circumferential direction;
   the clutch return mechanism has a rotating member that rotates in accordance with rotation of the handle and that has projections for pushing the teeth of the clutch cam to cause the clutch cam to rotate in the first direction by rotation of the handle when the clutch mechanism is in the interrupting state; and
   the regulating member regulates interference between the teeth of the clutch cam and the projections of the rotating member when the clutch mechanism has been switched from the transmitting state to the interrupting state by movement of the clutch-operating member.

6. The dual-bearing reel according to claim 5, further comprising:
   a drive shaft to which the handle is connected in an integrally rotatable manner and that supports the rotating member; and
   a torque limiting mechanism that limits torque transmitted between the drive shaft and the rotating member.

7. A dual-bearing reel comprising:
   a reel body;
   a spool that is rotatable with respect to the reel body;
   a handle that is rotatable with respect to the reel body;

first means for transmitting and interrupting a rotational force of the handle to the spool;

an operating member that is movably supported by the reel body for movement between a first position and a second position and that is biased toward the first position;

control means for alternately switching the first means to the transmitting state and the interrupting state based on the position of the operating member;

second means for returning the first means to the transmitting state by rotation of the handle when the first means is in the interrupting state; and regulating means for regulating operation of the second means when the second means has been switched from the transmitting state to the interrupting state by movement of the clutch-operating member.

8. The dual-bearing reel according to claim 7, further comprising a spool shaft that supports the spool, wherein the operating member has a rotating part that is rotatable around an axis of the spool shaft; and the regulating means is provided on the rotating part of the operating member.

9. The dual-bearing reel according to claim 8, wherein the regulating means is integrally provided with the rotating part.

10. The dual-bearing reel according to claim 8, wherein the regulating means extends from the rotating part in the axial direction of the spool shaft.

11. The dual-bearing reel according to claim 7, further comprising:

a drive shaft to which the handle is connected in an integrally rotatable manner and that supports the rotating member; and torque-limiting means for limiting torque transmitted between the drive shaft and the second means.

12. A dual-bearing reel comprising:

a reel body;

a spool that is rotatable with respect to the reel body;

a handle that is rotatable with respect to the reel body;

at least one gear disposed between the spool and the handle, the at least one gear having a first engaging feature;

a clutch having a second engaging feature complementary to the first engaging feature of the at least one gear, the clutch movable between engaged and disengaged positions with the at least one gear to transmit or interrupt transmission of rotational force between the handle and the spool;

a clutch-operating member that is movably supported by the reel body for movement between a first position and a second position and that is biased toward the first position;

a clutch cam having circumferentially spaced-apart teeth on an outer surface thereof, the cam adapted to rotate only in a first direction to drive the clutch between the engaged and the disengaged position in response to movement of the clutch-operating member;

a clutch return member that rotates in accordance with rotation of the handle and that has first projections for engaging the teeth of the clutch cam to cause the clutch cam to rotate in the first direction by rotation of the handle when the clutch is in the disengaged position; and a regulating member having a second projection positioned to interfere with the engagement of the first projections of the clutch return member and the teeth of the clutch cam when the clutch has been switched from the engaged position to the disengaged position by movement of the clutch-operating member.

13. The dual-bearing reel according to claim 12, further comprising a spool shaft that supports the spool, wherein the clutch-operating member has a rotating part that is rotatable around an axis of the spool shaft; and the regulating member is provided on the rotating part of the operating member.

14. The dual-bearing reel according to claim 13, wherein the regulating member is integrally provided with the rotating part.

15. The dual-bearing reel according to claim 13, wherein the regulating member extends from the rotating part in the axial direction of the spool shaft.

16. The dual-bearing reel according to claim 12, further comprising:

a drive shaft to which the handle is connected in an integrally rotatable manner and that supports the rotating member; and a torque limiting mechanism that limits torque transmitted between the drive shaft and the clutch return member.

* * * * *